(12) United States Patent
Nomura et al.

(10) Patent No.: US 6,339,519 B1
(45) Date of Patent: Jan. 15, 2002

(54) MAGNETIC HEAD DEVICE

(75) Inventors: Izumi Nomura; Haruyuki Morita; Masashi Shiraishi; Mitsuyoshi Kawai; Takeshi Wada, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/437,680

(22) Filed: Nov. 10, 1999

(30) Foreign Application Priority Data

Nov. 11, 1998 (JP) .......................................... 10-321005

(51) Int. Cl.$^7$ ................................................. G11B 5/60
(52) U.S. Cl. .................................................... 360/244.1
(58) Field of Search ............................ 360/244.1, 245.9

(56) References Cited

U.S. PATENT DOCUMENTS 6,084,746 A * 7/2000 Shiraishi et al. ............. 360/104

FOREIGN PATENT DOCUMENTS

| JP | 53-69623 | 6/1978 |
| JP | 3-108120 | 5/1991 |
| JP | 11-195215 | 7/1999 |

* cited by examiner

*Primary Examiner*—Robert S. Tupper
(74) *Attorney, Agent, or Firm*—Frishauf, Holtz, Goodman, Langer & Chick, P.C.

(57) ABSTRACT

There is disclosed a magnetic head device in which a head IC chip may be located relatively closer to a magnetic head and a thermal effect may be controlled to be within a range of acceptable degree. Said magnetic head device comprises a head slider having a magnetic head, a suspension member which is made of thin resilient material and supports the head slider at one end thereof, and a head IC chip, wherein the suspension member is attached to other member at the other end thereof. The IC chip is mounted on the suspension member. When the IC chip is selected to have appropriate disc side area and is mounted on the suspension member, the temperature of the IC chip itself may be maintained within a range of acceptable degree and that of the magnetic head may be also kept to be lower. When the electric power consumption of the IC chip is equal to or less than 410 mW, the disc side area thereof should be equal to or more than 1.1 mm$^2$. The IC chip is mounted on a surface of the suspension member at a side facing to the disc at a position where a relative linear velocity equal to or more than 25 m/sec is generated with respect to said disc.

16 Claims, 5 Drawing Sheets

MAGNETIC HEAD DEVICE

FIELD OF THE INVENTION

The present invention relates to a magnetic head device comprising a slider having a magnetic head, a resilient suspension structure carrying said slider and a head IC chip.

PRIOR ART

In conventional magnetic head device, a magnetic head for writing and/or reading magnetic information on a magnetic recording medium such as a magnetic disc is typically mounted on a slider which is maintained in a floating relationship with respect to the magnetic recording medium. The slider is supported by a suspension member formed by a resilient metallic film extended from an arm.

The head IC chip for amplifying a current for writing onto the magnetic head and a voltage for reading out from the magnetic head and for controlling the writing and/or reading operation is generally mounted on a movable arm provided for supporting one end of the suspension member. When the head IC chip is mounted on the movable arm, however, a lead wire connecting the head IC chip to the magnetic head is liable to be longer resulting in a cause of noise. In addition, a parasitic resistance and an inductance component generated by an increased length of the lead wire have an effect on increase of a rising and a falling times of pulse signals, which disturbs high speed data transfer. In order to solve the problems, there has been proposed by the Japanese Laid-Open Patent Publication No. Sho 53-69623 to mount the head IC chip on the slider. Further, in order to solve the similar problem, the Japanese Laid-Open Patent Publication No. Hei 3-108120 has also proposed to divide the IC chip into an IC main body and an IC sub-body and to mount the IC sub-body on the head slider.

In these known structure, though the noise problem caused by the long lead wire extended between the magnetic head and the head IC chip may be solved, there occur other problems that the temperature of the IC chip rises higher due to a heat generation of the IC chip itself caused by the current flowing therethrough during recording and that the magnetic head receives thermal effect of the heat generation of the IC chip.

More specifically, when the head IC is mounted on the movable arm, since said movable arm has a sufficient thermal capacity and an substantial area for heat dissipation, the temperature of the IC chip may be controlled to be sufficiently low owing to a thermal conduction through said movable arm and a heat dissipation from the arm surface. Further, since the IC chip is located far from the magnetic head, there is least possibility that the magnetic head is adversely affected by the heat generated in the head IC chip. To the contrary, when the head IC chip is located on the slider, it is difficult to ensure sufficient surface area for thermal diffusion so that it cannot be expected to lower the temperature through radiation of heat generated in the head IC chip. In addition, since the slider has a limited thermal capacity, it cannot be expected also to lower the temperature through the thermal conduction. As a result, the temperature of the head IC chip rises and thereby the reliability of the IC chip will be lowered. Further, since the magnetic head is located close to the head IC chip, there will be a possibility that the magnetic head is thermally affected by the heat generated in the IC chip and thereby the temperature of the magnetic head itself may rises up to an unacceptable level.

It is generally understood that the permissible temperature of a junction in the IC chip is 150° C. at the highest. This is because transistor junctions in the IC chip are gradually led to failure when they are operated for a long time under a temperature exceeding 150° C.

There is a request to apply more electric power to the head IC chip in order to obtain better recording current. This is because the reliability of medium has to be raised to make the density of magnetic record higher and consequently Hc value has to be made higher. Accordingly, much record current has to be applied to a record head to make large magnetic field for recording otherwise the recording is impossible. On the other hand, when the recording is performed in high frequency, more voltage is required to obtain fine waveform.

The applicant of the present invention has proposed in the Japanese Patent Application No. Hei 10-49105 the structure to improve radiation property by mounting the IC chip on the optimum position on the suspension. When the electric power consumption of the IC chip increases, however, some means is necessary to control the temperature of the IC chip to be lower than 150° C. which is a heat-resisting temperature thereof.

DISCLOSURE OF THE INVENTION

The present invention is accomplished in the light of the problems described above and the object thereof is to provides a magnetic head device in which a head IC chip may be located relatively closer to a magnetic head and a thermal effect may be controlled within a range of acceptable degree.

In order to accomplish above object, the present invention provides a magnetic head device comprising a head slider having a magnetic head thereon, a suspension member which is made of thin resilient material and supports said head slider at one end thereof, and a head IC chip, said suspension member being attached to other member at the other end thereof, wherein said head IC chip is mounted on said suspension member.

The inventor of the present invention found that, in the structure of the magnetic head device described above in which the head slider having the magnetic head thereon is mounted on an end of the suspension member formed by thin resilient material, when the head IC chip is mounted on the suspension member, depending on a surface area of the head IC chip, thermal conduction and heat dissipation may not be sufficient and the temperature of the IC chip may rise up beyond the permissible level and the magnetic head also may be subject to thermal effect. He found also that, when a disc side area thereof is selected to be appropriate value, the temperature of the IC chip may be held within the acceptable range and that of the magnetic head may also be held to be lower.

In an aspect of the present invention, the head IC chip is mounted on a surface of the suspension member at a side facing to the disc, a weight thereof is equal to or less than 1 mg, and a disc side area thereof is equal to or more than 0.6 $mm^2$. In another aspect of the present invention, an electric power consumption of the head IC chip is equal to or less than 410 mW and the disc side area thereof is equal to or more than 1.1 $mm^2$. In still another aspect of the present invention, the head IC chip is mounted on the surface of the suspension member at a side facing to the disc at a point where a relative linear velocity equal to or more than 15 m/sec is generated with respect to said disc at the outermost periphery thereof, and the electric power consumption of the head IC chip is equal to or less than 410 mW, and the disc side area thereof is equal to or more than 0.9 $mm^2$. In yet another aspect of the present invention, the head IC chip has a weight equal to or less than 1 mg, the electric power consumption thereof is equal to or less than 250 mW, and the disc side area thereof is equal to or more than 0.6 mm². When the electric power consumption of the head IC chip is equal to or less than 560 mW, the temperature of the head IC chip may be controlled to be equal to or lower than 150° C. by making the disc side area thereof be equal to or more than 1.4 mm². In this case, when the head IC chip is mounted on the point where a relative linear velocity equal to or more than 25 m/sec is generated with respect to said disc, the disc side area may be made to be equal to or more than 1.3 mm².

When the disc side area is less than the range described above, the temperature of the head IC chip rises up beyond the permissible level. As a reason thereof, it is estimated that there is a limit to use the suspension member as a radiation plate and the cooling of the IC chip is insufficient. As the mounting point of the IC chip comes closer to the tip end of the suspension member, the temperature of the magnetic head rises higher. This is a matter of course since the IC chip as a heat source comes close to the magnetic head. In the structure where the head IC chip is mounted on the head slider, which is described in the aforementioned Laid-Open Patent Publication, both the temperature of the IC chip itself and that of the magnetic disc rise up to an extremely high level. When the area of the surface of head IC chip at a side facing to the disc is determined according to the present invention, the temperature of the IC chip as well as that of the magnetic disc may be always held within the acceptable range.

It is preferable that the suspension member is made of resilient metal such as stainless steel and the head IC chip is supported on a surface of the suspension member through a layer of an electrically insulating material such as a resin material like polyimide. It is further preferable that the following relation is satisfied:

$$23.53 \times S2 - 73.938 \times S + 77.99 < 1000/W$$

where S is the disc side area of the head IC chip (mm²), and W is the electric power consumption of the head IC chip (watt) during head recording.

It is preferable that a resilient layer made of resilient metal having a width smaller than that of the suspension member is formed on a surface of the suspension member on which the head IC chip is mounted, an electrically insulating resin material layer is formed on said resilient layer, a lead wire connected to the head IC chip is laid on said electrically insulating resin material layer, and said lead wire is covered by the electrically insulating resin material. In this case, the head IC chip is disposed on a layer of the resin material such as polyimide covering said lead wire and is connected to said lead wire by soldering or gold bonding. It is preferable that the head IC chip is mounted on the same side surface of the suspension member with that for the head slider, and a packaging height of the head IC from the suspension member is lower than the height of the head slider.

Further, the present invention does not limit the mounting position of the head IC to the suspension member, the head IC may be mounted on a suspension support member for supporting the suspension member.

DESCRIPTION OF THE PREFERRED EMBODIMENT

Figure 1:
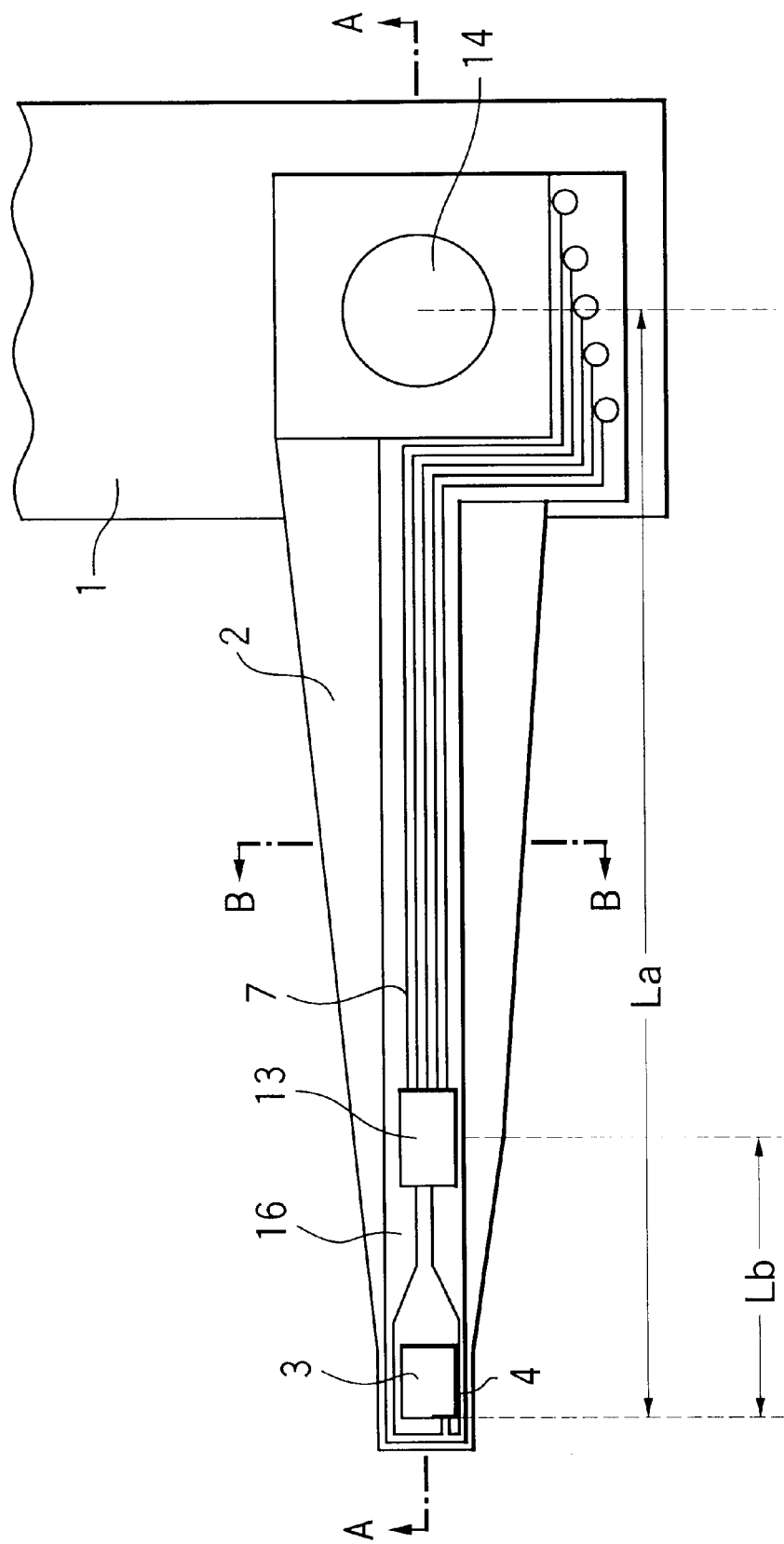
FIG. 1 is a plan view of the magnetic head device of an embodiment of the present invention.

There will now be described the preferred embodiments of the present invention with reference to the drawings. In FIG. 1, a magnetic head device includes a suspension member 2 attached on an end thereof to a movable arm 1 at an attaching point 14. Said suspension member 2 is made of resilient thin stainless steel sheet formed to have a width gradually decreasing toward the tip and typically has a thickness of approximately 70 to 75 $\mu$m.

On an upper surface of the suspension member 2, a flexure member 16 having narrower width than that of said suspension member 2 is disposed. Said flexure member 16 is made of stainless steel and typically has a thickness of approximately 25 $\mu$m. The flexure member 16 is extended from the attaching point 14 where the suspension member 2 is attached to the movable arm to the tip of said suspension member 2. On an upper surface of the flexure member 16, a layer 9 made of electrically insulating resin material such as polyimide is formed, and in said electrically insulating resin material layer 9 is disposed a necessary number of lead wires 7 for input and output.

Figure 2:
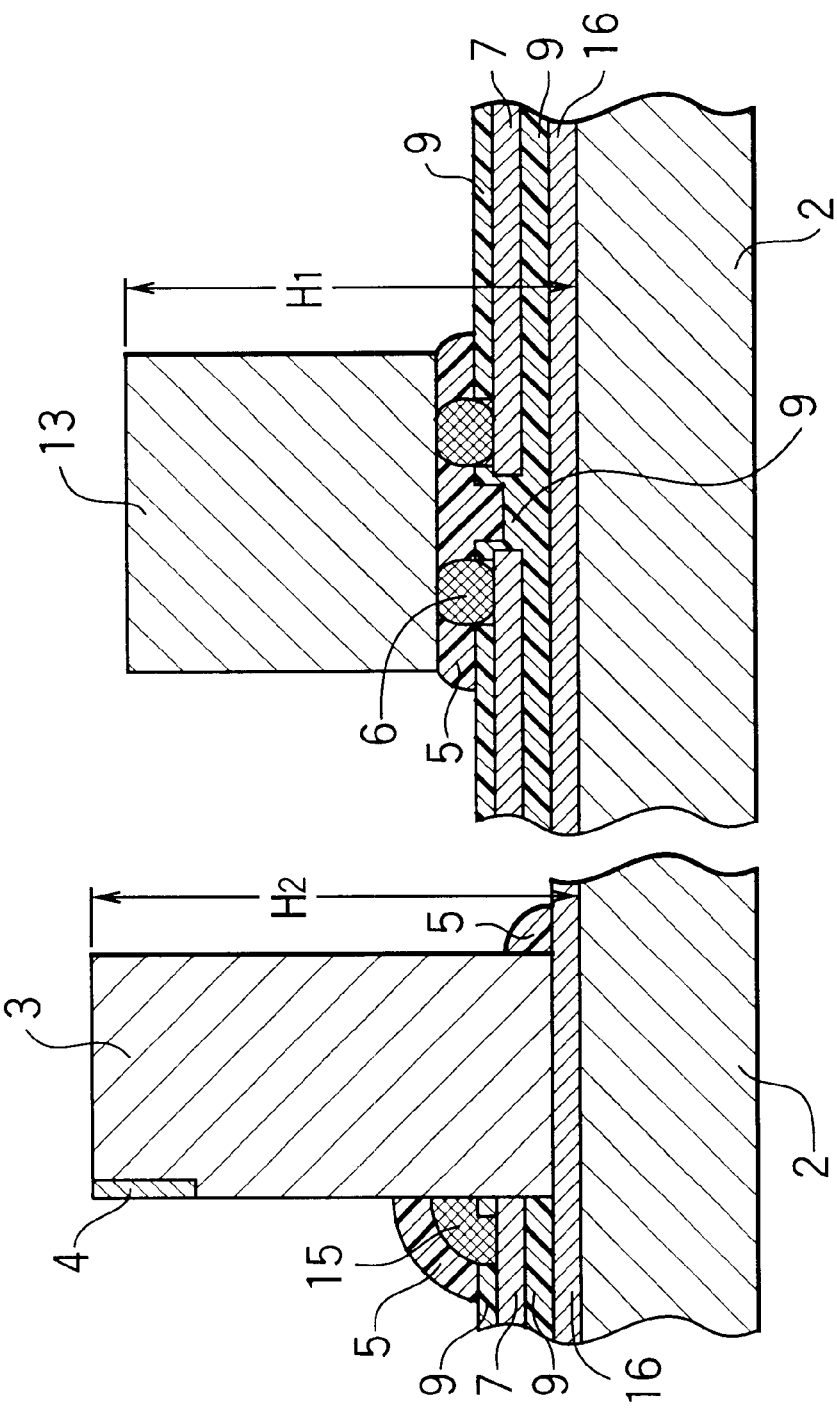
FIG. 2 is a sectional view of the magnetic head device taken on line A—A of FIG. 1.
Figure 3:
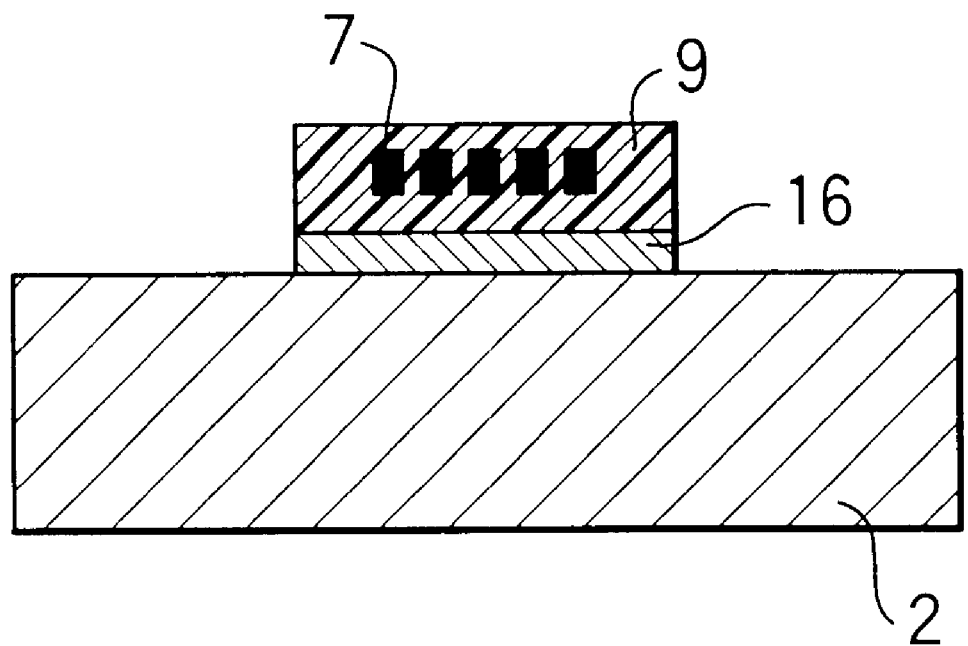
FIG. 3 is a sectional view of the magnetic head device taken on line B—B of FIG. 1.

At the tip of the suspension member 2, a head slider 3 for supporting a magnetic head 4 on the electrically insulating resin material layer 9 formed on the upper surface of the flexure member 16 is disposed. As shown in FIG. 1, the necessary number of lead wires 7 is extended to the tip of the flexure member 16 passing through both sides of the head slider 3 and is turned back from the tip, as shown in FIG. 2, to be connected to the magnetic head 4 on the head slider 3 through a gold bump 15. This connected portion is covered by an electrically insulating resin material layer 5.

On a middle portion of the suspension member 2 along length thereof, a head IC chip 13 is mounted on the same surface with that for the head slider 3. As shown in details in FIG. 2, the head IC chip 13 is mounted on the layer 9 of electrically insulating resin material such as polyimide formed on the flexure member 16 on the suspension member 2 and a layer 5 of electrically insulating resin material such as silicon resin is injected. The lead wire 7 is electrically connected to the head IC chip 13 by the use of solder 6 or gold bonding, which penetrates an upper cover of the resin material layers 5 and 9, for example, by flip chip bonding. Since this packaging structure of the head IC chip 13 makes a packaging volume compact, this structure is suitable for attaching to small size component such as suspension member. In addition, there is another advantage that the reliable connecting method such as soldering or gold bonding may be employed.

As shown in FIG. 2, when a height Hi of the head IC chip 13 and a height H2 of the head slider 3 in a packaged condition are represented respectively by a distance from the surface of the suspension member 2 to each upper surface of the head IC chip 13 or the head slider 3, the height H1 of the head IC chip 13 is shorter than the height H2 of the head slider 3. Therefore, in operating condition, the head IC chip 13 does not contact with the surface of the magnetic recording disc. Further, there is an advantage that the cooling effect of the IC chip is enhanced by the air flow caused by a rotation of the magnetic recording disc.

The head IC chip is preferably a bare chip whose weight is equal to or leas than 1.0 mg. For more stability, the weight of the head IC chip is preferably equal to or less than 0.8 mg. Decreasing the weight of the IC chip prevents the mechanical vibration characteristic from being deteriorated when said IC chip is mounted on the suspension member 2.

Figure 4:
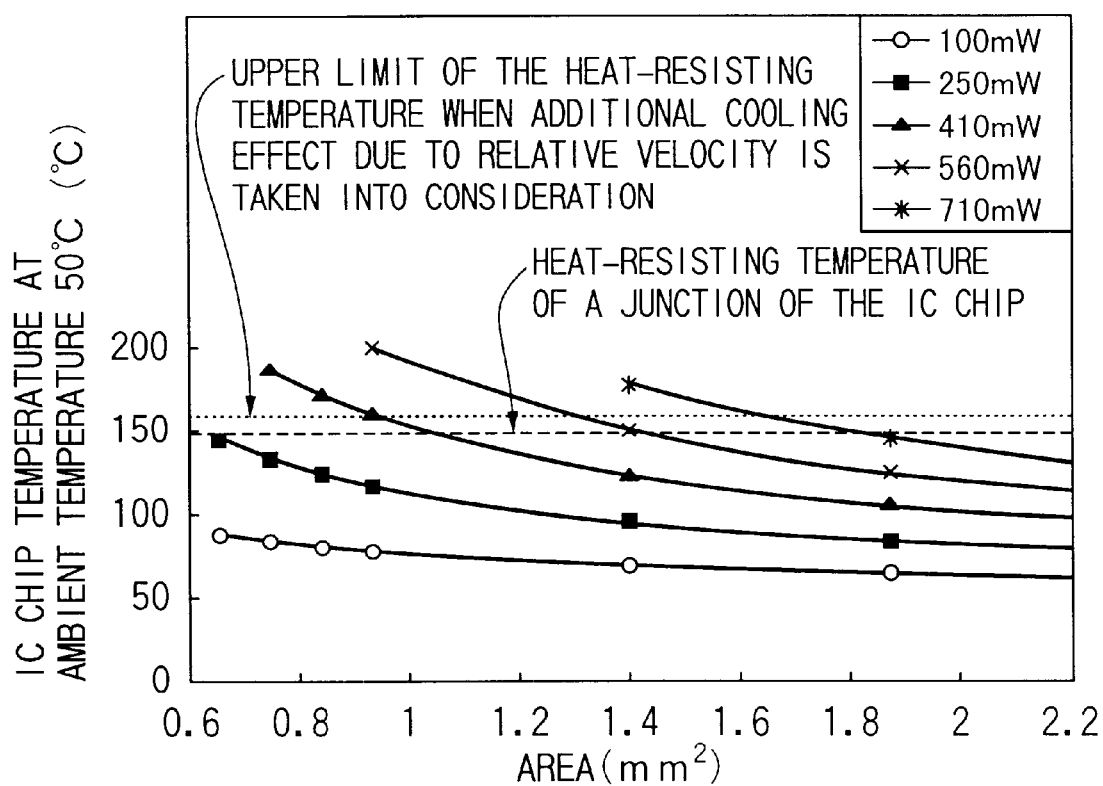
FIG. 4 is a diagram showing the relation between the temperature of the head IC chip in operation and the area of the head IC chip on the surface facing to the disc.

FIG. 4 shows the relation between the temperature of the head IC chip 13 in operation and the area of the head IC chip 13 on the surface facing to the disc. This drawing shows the cases for various degrees of electric power consumption of the IC chip 13, and, in any case, the weight of the IC chip 13 is equal to or less than 1.0 mg. In the drawing, a horizontal line of 150 degree shows a heat-resisting temperature of a junction of the IC chip, and a broken line above it shows an upper limit of the heat-resisting temperature taking an additional cooling effect of an air flow caused by a relative motion between the IC chip and the disc into consideration. This broken line shows the case where the head IC chip is mounted in a position for generating a relative linear velocity of approximately 15 m/sec with respect to the disc at an outermost periphery thereof. As shown in the drawing, the more the electric power consumption of the head IC chip in operation increases, the more the area of the head IC chip 13 on the surface facing to the disc have to be increased.

As shown in FIG. 4, the temperature of the head IC chip 13 in operation tends to be lowered as the area of said head IC chip 13 on the surface facing to the disc is increased more. This is because the heat of the IC chip 13 is dissipated into the air by the wind generated by a rotation of the disc. The wind velocity is higher in a surface closest to the disc than in other surfaces, and, the more the area of the head IC chip 13 on the surface facing to the disc increases, the more the heat is dissipated by an air convection. In addition, since the heat dissipation by the radiation to the disc can be expected more on the surface closer to the disc comparing with other surface, the cooling effect is enhanced. Therefore, when the area of the head IC chip 13 on the surface facing to the disc is set to be within a range determined in relation to the electric power consumption of the head IC chip 13, the temperature of said IC chip 13 can be maintained within the range of heat-resisting temperature. In this case, it is preferable to take the mounting point of the head IC chip 13 on the suspension member into consideration.

More concretely, as being obvious from FIG. 4, the area of the head IC chip on the disc side should be equal to or more than 0.6 mm$^2$. Especially, when the electric power consumption of the head IC chip is equal to or less than 250 mW, all the requirement is that the disc side area thereof is equal to or more than 0.6 mm$^2$. When the electric power consumption of the head IC chip is equal to or less than 410 mW, the disc side area thereof may be equal to or more than 1.1 mm$^2$. Further, when the head IC chip is mounted on the surface of the suspension member at a side facing to the disc so that the relative linear velocity equal to or more than 15 m/sec will be generated with respect to said disc at the outermost periphery thereof, and the electric power consumption of the head IC chip is equal to or less than 410 mW, the disc side area of the IC chip may be equal to or more than 0.9 mm$^2$. When the electric power consumption of the head IC chip is equal to or less than 560 mW, the temperature of the head IC chip may be controlled to be equal to or lower than 150° C. by making the disc side area thereof be equal to or more than 1.4 mm$^2$. In this case, the disc side area of the head IC chip may be equal to or more than 1.3 mm$^2$ if the head IC chip is mounted on a place where the relative linear velocity equal to or more than 25 m/sec will be generated with respect to said disc.

Figure 5:
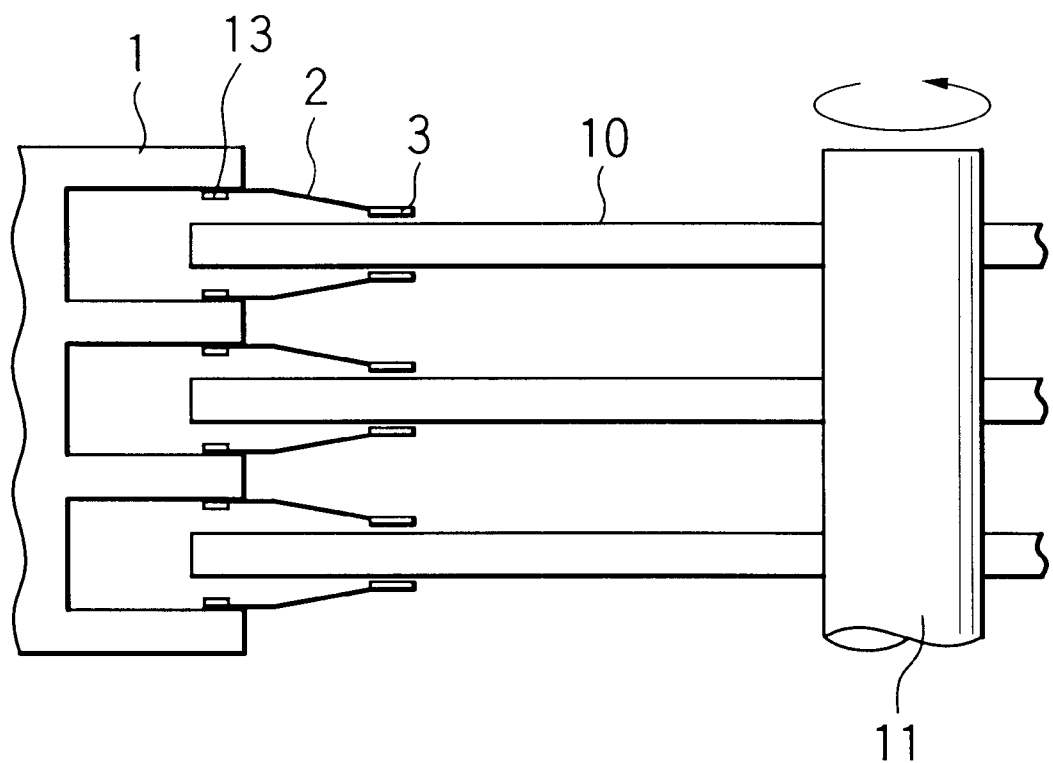
FIG. 5 is a side elevation view of the magnetic head device of another embodiment of the present invention.
Figure 6:
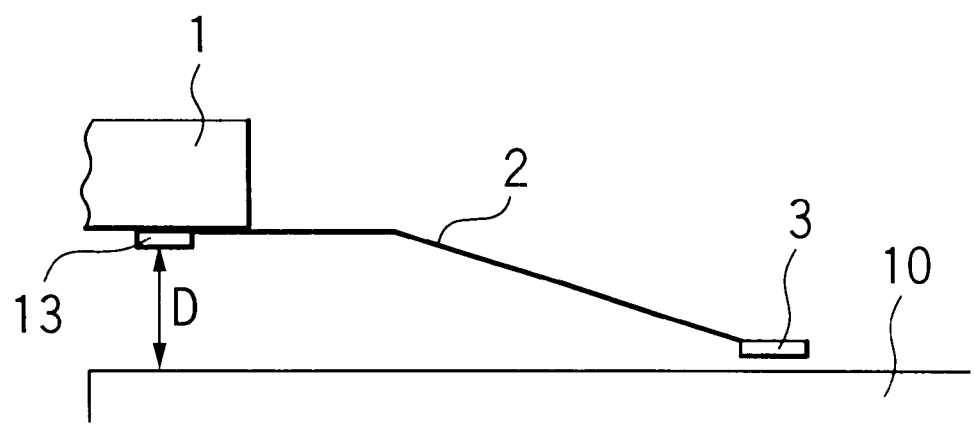
FIG. 6 is an enlarged view of the magnetic-head mechanism portion of the embodiment shown in FIG. 5.

The present invention is not limited to the structure where the head IC chip 13 is mounted on the suspension member. That is, the head IC chip 13 may be mounted on any place where an air flow generated by the disc rotation is always supplied, for example, on the support member for supporting the suspension member. FIGS. 5, 6 show an embodiment of such structure in which a plurality of magnetic discs 10 is arranged so as to be rotated around an axial line of an axis 11. The suspension member 2 supports the head slider 3 at one tip end thereof and is attached at the other end thereof to the movable arm 1 which is a suspension support member. The head IC chip 13 is mounted on a surface of the movable arm 1 facing to the magnetic recording disc 10. In details, a connecting line member for connecting a magnetic head element and the head IC chip to other electric circuits is laid from the surface of the suspension member 2 at a side facing to the magnetic disc to the surface of the movable arm facing to the magnetic disc, and the head IC chip 13 is placed on the movable arm 1 at a position facing to a surface of the magnetic recording disc 10. AS shown in the drawing, it is preferable that the head IC chip 13 is placed to be inner side of the outer periphery of the magnetic recording medium. Further, it is preferable that distance D between the surface of the magnetic recording medium 10 facing to the head IC chip 13 and the head IC chip 13, which is shown in FIG. 6, is set to be equal to or less than 1000 μm.

As described above, according to the present invention, the temperature of the head IC chip in operation may be maintained to be within the acceptable range even if said head IC chip is driven under high electric power consumption for recording when the surface area of the head IC chip facing to the disc is within the specified range.

What is claimed is:

1. A magnetic head device comprising a head slider having magnetic head, a suspension member which is made of thin resilient material and supports said head slider at one end thereof, and a head IC chip, wherein said head IC chip is mounted on a surface of said suspension member at a side facing to a disc, an electric power consumption of said head IC chip is between 250 mW and 410 mW, and a disc side area thereof is equal to or more than 1.1 mm$^2$.

2. A magnetic head device comprising a head slider having a magnetic head, a suspension member which is made of thin resilient material and supports said head slider at one end thereof, and a head IC chip, wherein said head IC chip is mounted on a surface of said suspension member at a side facing to a disc at a position where a relative linear velocity equal to or more than 15 m/sec is generated with respect to said disc at an outermost periphery thereof, an electric power consumption of said head IC chip is between 250 mW and 410 mW, and a disc side area thereof is equal to or more than 0.9 mm$^2$.

3. A magnetic head device comprising a head slider having a magnetic head, a suspension member which is made of thin resilient material and supports said head slider at one end thereof, and a head IC chip, wherein said head IC chip is mounted on a surface of said suspension member at a side facing to a disc, a weight of said head IC chip is equal to or less than 1 mg, an electric power consumption of said head IC chip is equal to or less than 250 mW, and a disc side area thereof is equal to or more than 0.6 mm$^2$.

4. A magnetic head device comprising a head slider having a magnetic head, a suspension member which is made of thin resilient material and supports said head slider at one end thereof, and a head IC chip, wherein said head IC chip is mounted on a surface of said suspension member at a side facing to a disc, an electric power consumption of said head IC chip is between 410 mW and 560 mW, and a disc side area thereof is equal to or more than 1.4 mm$^2$.

5. A magnetic head device comprising a head slider having a magnetic head, a suspension member which is made of thin resilient material and supports said head slider at one end thereof, and a head IC chip, wherein said head IC chip is mounted on a surface of said suspension member at a side facing to a disc at a position where a relative linear velocity equal to or more than 15 m/sec is generated with respect to said disc at an outermost periphery thereof, an electric power consumption of said head IC chip is between 410 mW and 560 mW, and a disc side area thereof is equal to or more than 1.3 mm$^2$.

6. A magnetic head device comprising a head slider having a magnetic head, a suspension member which is made of thin resilient material and supports said head slider at one end thereof, and a head IC chip, wherein said head IC chip is mounted on a surface of said suspension member at a side facing to a disc, an electric power consumption of said IC chip is between 560 mW and 710 mW, and a disc side area thereof is equal to or more than 1.8 mm$^2$.

7. A magnetic head device comprising a head slider having a magnetic head, a suspension member which is made of thin resilient material and supports said head slider at one end thereof, and a head IC chip, wherein said head IC chip is mounted on a surface of said suspension member at a side facing to a disc at a position where a relative linear velocity equal to or more than 15 m/sec is generated with respect to said disc at an outermost periphery thereof, an electric power consumption of said IC chip is between 560 mW and 710 mW, and a disc side area thereof is equal to or more than 1.6 mm$^2$.

8. A magnetic head device as claimed in any one of claims 1 to 5, 6 and 7, in which said head IC chip is supported on a surface of said suspension member through a layer of an electrically insulating material.

9. A magnetic head device as claimed in any one of claims 1 to 5, 6 and 7, in which a resilient layer made of resilient metal having a width smaller than that of the suspension member is formed on a surface of the suspension member on which the head IC chip is mounted, an electrically insulating resin material layer is formed on said resilient layer, a lead wire connected to said head IC chip is laid on said electrically insulating resin material layer, and said lead wire is covered by the electrically insulating resin material.

10. A magnetic head device as claimed in claims 9, in which said head IC chip is disposed on said resin material layer covering said lead wire and is connected to said lead wire by gold bonding.

11. A magnetic head device as claimed in claims 10, in which said head IC chip is connected by flip chip bonding.

12. A magnetic head device as claimed in any one of claims 1 to 5, 6 and 7 in which said head IC chip is mounted on the same side surface of said suspension member with that for said head slider, and a packaged height of said head IC chip from said suspension member is shorter than a height of said head slider.

13. A magnetic disc device comprising:

magnetic head device including a slider having a magnetic head element, a suspension member for supporting said slider at one end thereof, and a suspension support member for supporting said suspension member at the other end thereof; and a magnetic disc medium disposed facing to said magnetic head device so as to relatively rotate with respect to said magnetic head device;

wherein a head IC chip is mounted on said magnetic head device, said magnetic disc device characterized by that:

at least when write current for said magnetic head element flows through said head IC chip, said head IC chip is mounted on a place where an air flow generated by a rotation of said magnetic disc medium is always supplied;

an electric power consumption of said head IC chip is equal to or less than 410 mW; and a disc side area of said head IC chip is equal to or more than 1.1 mm$^2$.

14. A magnetic disc device as claimed in claim 13, in which a connecting line member for connecting said magnetic head element and said head IC chip to other electric circuits is provided and said head IC chip is disposed on said connecting line member.

15. A magnetic disc device as claimed in either of claims 13 or 14, in which said head IC chip is placed to be inner side of the outer periphery of said magnetic disc medium to face to said magnetic disc.

16. A magnetic disc device as claimed in claim 15, in which a distance between said head IC chip and a surface of said rotatable magnetic disc medium facing to the head IC chip is set to be equal to or less than 1000 µm.

* * * * *